United States Patent
Barrick et al.

(10) Patent No.: US 11,163,571 B1
(45) Date of Patent: Nov. 2, 2021

(54) FUSION TO ENHANCE EARLY ADDRESS GENERATION OF LOAD INSTRUCTIONS IN A MICROPROCESSOR

(71) Applicant: International Business Machines Corporation, Armonk, NY (US)

(72) Inventors: Brian D. Barrick, Pflugerville, TX (US); Sundeep Chadha, Austin, TX (US); Sheldon Bernard Levenstein, Austin, TX (US); Phillip G. Williams, Cape Coral, FL (US); Niels Fricke, Herrenberg (DE); Dung Q. Nguyen, Austin, TX (US); Brian W. Thompto, Austin, TX (US); Christian Gerhard Zoellin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/941,583

(22) Filed: Jul. 29, 2020

(51) Int. Cl.
*G06F 9/38* (2018.01)
*G06F 9/30* (2018.01)

(52) U.S. Cl.
CPC ...... *G06F 9/30181* (2013.01); *G06F 9/30032* (2013.01); *G06F 9/30043* (2013.01)

(58) Field of Classification Search
None
See application file for complete search history.

(56) References Cited

U.S. PATENT DOCUMENTS

| | | | |
|---|---|---|---|
| 5,813,045 A | 9/1998 | Mahalingaiah | |
| 7,398,372 B2 | 7/2008 | Samra | |
| 7,426,630 B1* | 9/2008 | Chong | G06F 9/30116 |
| | | | 712/218 |
| 7,458,069 B2 | 11/2008 | Ronen | |
| 8,090,931 B2 | 1/2012 | Col | |
| 8,856,496 B2 | 10/2014 | Henry | |
| 9,477,474 B2 | 10/2016 | Gschwind | |
| 2004/0034757 A1 | 2/2004 | Gochman | |
| 2018/0349096 A1* | 12/2018 | Redfern | G06F 7/36 |
| 2019/0220279 A1* | 7/2019 | Mcneeney | G06F 9/30043 |
| 2019/0324927 A1* | 10/2019 | Ajima | G06F 9/30181 |
| 2019/0347098 A1* | 11/2019 | Marathe | G06F 9/3004 |
| 2020/0201811 A1* | 6/2020 | Felix | G06F 9/30032 |
| 2021/0182077 A1* | 6/2021 | Chen | G06N 3/02 |

FOREIGN PATENT DOCUMENTS

WO 2017105735 A1 6/2017

OTHER PUBLICATIONS

Dao et al., "FlexBex: A RISC-V with a Reconfigurable Instruction Extension", Dec. 2020 (Year: 2020).*
Schmit et al. "Queue Machines: Hardware Compilation in Hardware", 2002, Computer Society (Year: 2002).*

(Continued)

*Primary Examiner* — Hyun Nam
(74) *Attorney, Agent, or Firm* — David B. Woycechowsky

(57) ABSTRACT

Technology for fusing an add-immediate instruction with a load-immediate instruction (or store-immediate instruction) in a microprocessor. This can result in quicker address generation while performing a load and store operation.

20 Claims, 6 Drawing Sheets

(56) References Cited

OTHER PUBLICATIONS

Celio et al., "The Renewed Case for the Reduced Instruction Set Computer: Avoiding ISA Bloat with Macro-Op Fusion for RISC-V", Electrical Engineering and Computer Sciences, University of California at Berkeley, Technical Report No. UCB/EECS-2016-130, <http://www.eecs.berkeley.edu/Pubs/TechRpts/2016/EECS-2016-130.html>, Jul. 8, 2016, 18 pages.

Lu et al., "Instruction Fusion for Multiscalar and Many-Core Processors", International Journal of Parallel Programming, DOI 10.1007/s10766-015-0386-1 (published online Sep. 30, 2015), 13 pages.

\* cited by examiner

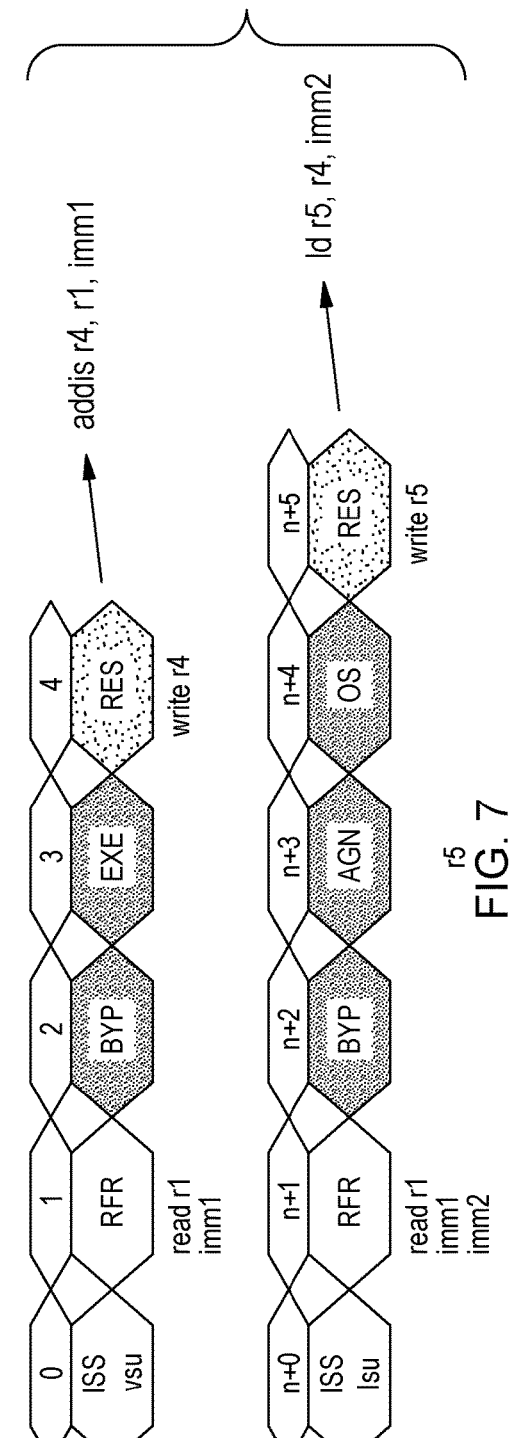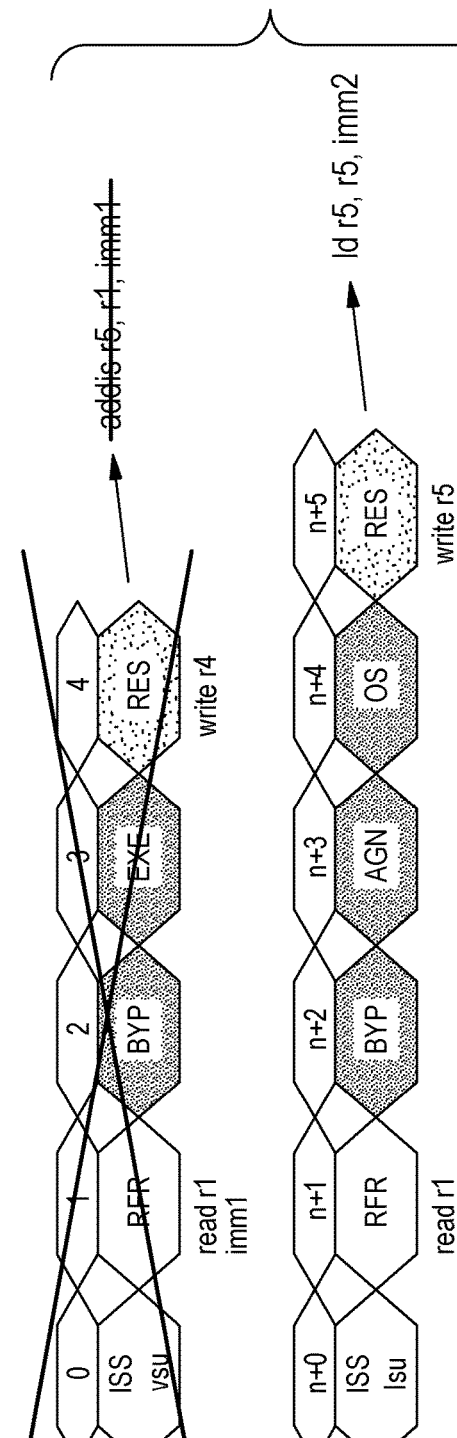

FUSION TO ENHANCE EARLY ADDRESS GENERATION OF LOAD INSTRUCTIONS IN A MICROPROCESSOR

BACKGROUND

The present invention relates generally to the field of execution of load-immediate and add-immediate instructions by microprocessors that are characterized by a load-store architecture.

The Wikipedia entry for "load-store architecture" (as of 7 Jul. 2020) states, in part, as follows: "In computer engineering, a load-store architecture is an instruction set architecture that divides instructions into two categories: memory access (load and store between memory and registers), and ALU operations (which only occur between registers). RISC instruction set architectures such as PowerPC, SPARC, RISC-V, ARM, and MIPS are load-store architectures. For instance, in a load-store approach both operands and destination for an ADD operation must be in registers. This differs from a register-memory architecture (for example, a CISC instruction set architecture such as x86) in which one of the operands for the ADD operation may be in memory, while the other is in a register. The earliest example of a load-store architecture was the CDC 6600. Almost all vector processors (including many GPUs . . . ) use the load-store approach." (footnotes omitted)

The Wikipedia entry for "instruction unit" (as of 7 Jul. 2020) states, in part, as follows: "The instruction unit (IU), also called instruction fetch unit (IFU) or instruction issue unit . . . , in a central processing unit (CPU) is responsible for organising program instructions to be fetched from memory, and executed, in an appropriate order. It is a part of the control unit, which in turn is part of the CPU. In the simplest style of computer architecture, the instruction cycle is very rigid, and runs exactly as specified by the programmer. In the instruction fetch part of the cycle, the value of the instruction pointer (IP) register is the address of the next instruction to be fetched. This value is placed on the address bus and sent to the memory unit; the memory unit returns the instruction at that address, and it is latched into the instruction register (IR); and the value of the IP is incremented or over-written by a new value (in the case of a jump or branch instruction), ready for the next instruction cycle. This becomes a lot more complicated, though, once performance-enhancing features are added, such as instruction pipelining, out-of-order execution, and even just the introduction of a simple instruction cache." (footnotes omitted) It is noted that the acronym "ISU" herein is used to refer to an Instruction Sequencing Unit, and not the Instruction Issue Unit mentioned in the foregoing Wikipedia quotation.

The Wikipedia entry for "load-store unit" (as of 7 Jul. 2020) states, in part, as follows: "In computer engineering a load-store unit (LSU) is a specialized execution unit responsible for executing all load and store instructions, generating virtual addresses of load and store operations and loading data from memory or storing it back to memory from registers. The load-store unit usually includes a queue which acts as a waiting area for memory instructions, and the unit itself operates independently of other processor units. Load-store units may also be used in vector processing, and in such cases the term 'load-store vector' may be used. Some load-store units are also capable of executing simple fixed-point and/or integer operations." (footnotes omitted)

Addis type instructions (sometimes referred to herein as "Add Immediate Shifted"), for execution by processors, are known. An addis type instruction places the sum of the contents of general-purpose register (GPR) RA and the concatenation of a 16-bit unsigned integer, SI or UI, and x'0000' into the target GPR RT. If GPR RA is GPR 0, then the sum of the concatenation of 0, SI or UI, and x'0000' is stored into the target GPR RT. Typically, the syntax for an addis type instruction, as implemented in a particular processor, will be "ADDIS." A combination of an addis instruction, followed by LD (that is, a "plain load instruction"), is commonly used to load from storage that are an offset from RA. The addis allows larger offset values.

A load is an instruction which moves data from memory to a register. Example: ld RT,DS(RA). The doubleword in storage addressed by RA+DS are read and placed in register RT. This is sometimes written as ld RT,RA,DS. A doubleword is defined by one commercially available processor as 64-bits of data. DS is a constant which the program places in the instruction and for ld is 14-bits. There are other types of load instructions, besides the plain load instruction mentioned earlier in this paragraph, defined by one commercially available processor, such as lbz, lhz, lwz which represent loading a byte/half-word and word (8, 16, 32-bits).

SUMMARY

According to an aspect of the present invention, there is a method, computer processor device and/or computer system that performs the following operations (not necessarily in the following order): (i) receiving, by a thread in the processor, a shifted immediate field instruction; (ii) determining, by the processor hardware, that the immediately subsequent instruction in the thread is a load/store-immediate instruction; (iii) responsive to the determination that the immediately subsequent instruction in the thread is a load/store-immediate instruction; and (iv) fusing the shifted immediate field instruction with the load/store-immediate instruction so that: (a) an order of the shifted immediate field instruction and the load/store immediate instruction is swapped, and (b) the load/store immediate instruction is modified to include the operands of the shifted immediate field instruction.

BRIEF DESCRIPTION OF THE DRAWINGS

FIG. 7 is another diagram helpful in understanding various embodiments of the present invention; and FIG. 8 is another diagram helpful in understanding various embodiments of the present invention.

DETAILED DESCRIPTION

Figure 1:
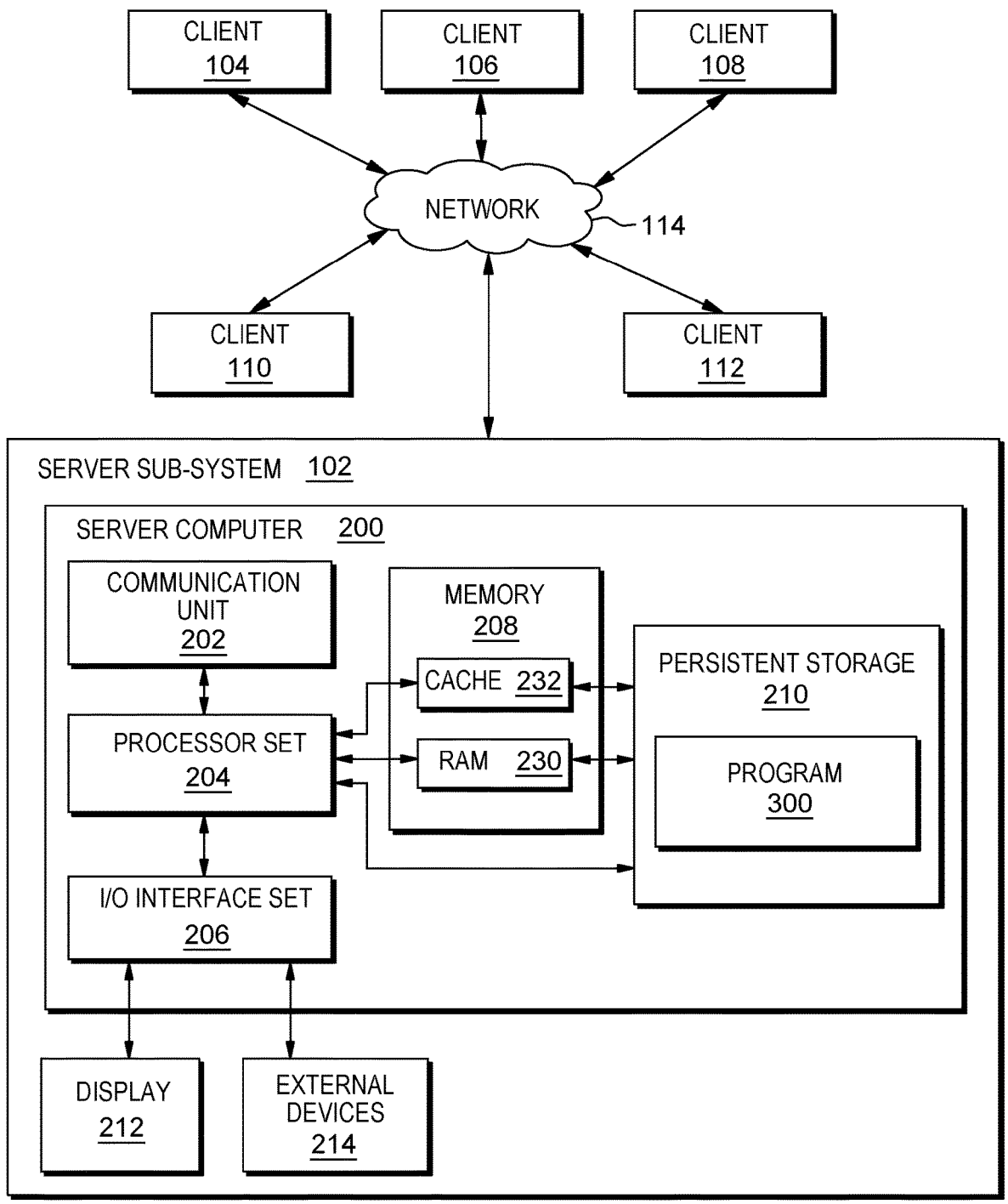
FIG. 1 is a block diagram of a first embodiment of a system according to the present invention.

Some embodiments of the present invention are directed to technology for fusing a load-immediate instruction with its producer (for example, an addis instruction) in a microprocessor. This can result in quicker address generation in the microprocessor. Some embodiments of the present invention are hardware-based and involve the add immediate shifted (addis) instruction followed by a load or store immediate instruction. Some embodiments relate to how addis is fused with the load or store instruction to allow the load or store instruction to be executed faster. With currently conventional technology, the addis must first be executed and results returned before the load or store instruction can be issued—some embodiments of the present invention, the addis instruction does not need to be executed and results returned before the load or store instruction can be issued from the issue queue (within the ISU) and to the load store unit (LSU), with the load being dependent on the result of the addis instruction. For the case where the addis and the LD (load instruction) do not write the same register, the result of the addis is written to the logical register. For the destructive case (where the addis and ld write the same register), the addis result does not have to be written due to the fact that it is immediately overwritten by the load and thus no other instructions could ever use the addis result.

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Networked computers system 100 includes: server subsystem 102 (sometimes herein referred to, more simply, as subsystem 102); client subsystems 104, 106, 108, 110, 112; and communication network 114. Server subsystem 102 includes: server computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. An Embodiment

Figure 2:
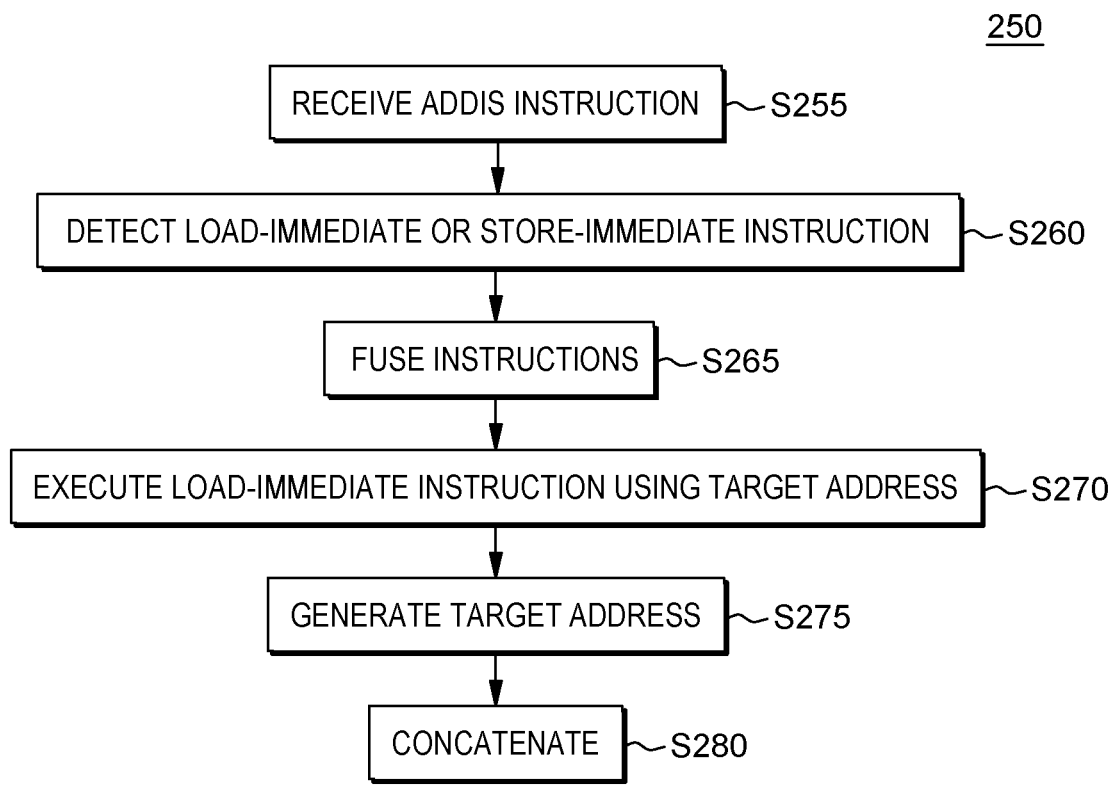
FIG. 2 is a flowchart showing a first embodiment method performed, at least in part, by the first embodiment system.
Figure 3:
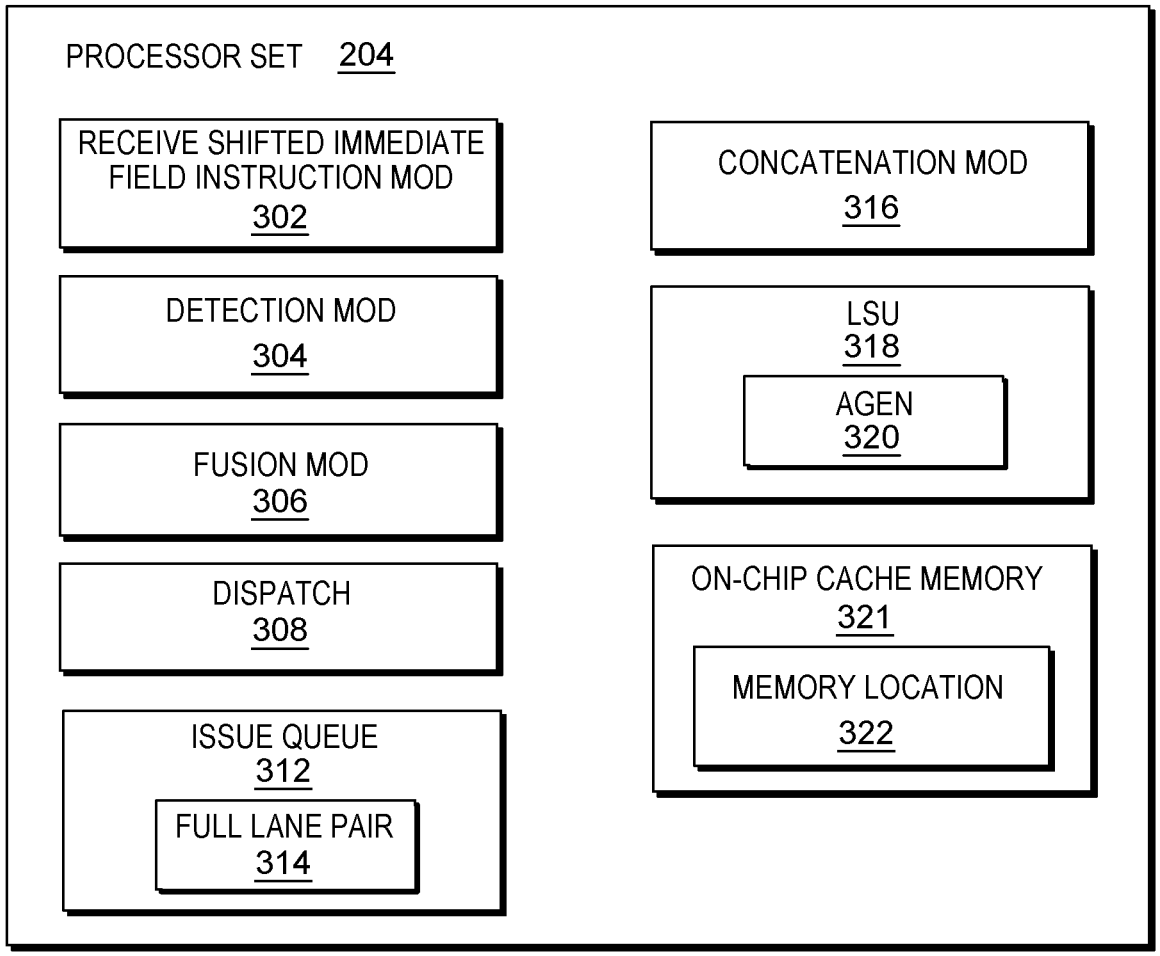
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, processor set 204 includes machine logic (that is, hardware and/or programming) to perform and/or control performance of at least some of the method operations of flowchart 250. This method and parts of processor set 204 will now be discussed, over the course of the following paragraphs, with extensive reference to the blocks of FIGS. 1, 2 and 3.

Processing begins at operation S255, where receive shifted immediate field instruction module ("mod") 302 receives an addis instruction. In this embodiment, the addis instruction is a conventional "ADDIS" instruction and it is received into a thread of processor set 204 in a conventional way. Alternatively or additionally, other types of "shifted immediate field instructions" may be used, such as subtract immediate shifted (subtractis) type instructions (in processors that support this type of instruction). A "shifted immediate field instruction" is any processor instruction that causes addition (or subtraction) of a register with a shifted immediate field and is a simple add/subtract of a register plus immediate field.

Processing proceeds to operation S260, where detection mod 304 detects that the next instruction received after the shifted immediate field instruction (for example, addis) is a load-imm instruction, which means that the load-imm instruction can be fused to the preceding shifted immediate field instruction. Some types of load-immediate instruction to which various embodiments of the present invention may include: load-immediate, load byte and zero, load halfword and zero, load halfword algebraic, load word and zero, load word algebraic and load doubleword. Alternatively or additionally, the next instruction could be a store-immediate instruction. Some types of store-immediate instructions that may be employed in various embodiments of the present invention include the following: store byte (stb), store halfword (sth), store word (stw) and store doubleword (std).

Processing proceeds to operation S265, where fusion mod 306 fuses the addis instruction with the load immediate instruction so that: (i) the order of the instructions is swapped; and (ii) the load-immediate instruction is modified to include the operands of the addis instruction.

More specifically, in this example operation S265 includes the following sub-operations: (i) force addis and load-imm to be paired together to dispatch 308; (ii) swap instruction ordering within pair and modify load-immediate instruction to include addis operands; (iii) dispatch into full lane pair 314 of issue queue 312; and (iv) issue queue 312 issues the modified load instruction.

Alternatively, a subtract immediate shifted instruction could be similarly fused by changing the way the immediate bits are manipulated by inverting the value and then adding to the immediate field of the load instruction.

Processing proceeds to operation S270, where concatenation mod 316, while reading a regfile (not separately shown in the Figures) for a first operand, concatenates: (i) an immediate field from the original addis; and (ii) an immediate field of the load instruction for second operand.

Processing proceeds to operation S275, where load store unit (LSU) 318 address generation portion (AGEN) 320: (i) receives the first operand from the regfile; (ii) receives the second operand from immediate field manipulation; and (iii) generates a target address for use in the execution of the load operation (to be discussed in the next paragraph).

Figure 4:
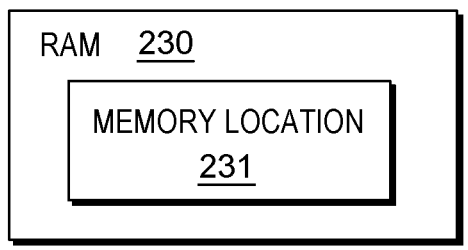
FIG. 4 is a screenshot view generated by the first embodiment system.

Processing proceeds to operation S280, where LSU 318 executes the load, of the results of the immediate shift field instruction (for example, an addis type instruction) using memory location 322, of on-chip cache memory 321, located at the target address generated at operation S275. The common case of the instruction stream including an addis followed by a load immediate is ultimately so there is an effective immediate value for the load instruction of 32-bits instead of 16-bits. In this embodiment, the target address is located in on-chip cache memory 321. Alternatively, the target address may refer to a set of registers in processor set 204. As a further alternative, the results of the shifted immediate field operation may be stored, as shown in FIG. 4, at memory location 231 of RAM 230 of server computer 200.

III. Further Comments and/or Embodiments

Some embodiments of the present invention may include, a computer processor having a load-store architecture fuses a load or store instruction with another instruction that produced the load or store instruction (sometimes herein referred to as a "producer"). Instructions eligible for the fusion are detected and identified when they are fetched. Special handling provides for the immediate field of the producer to be concatenated with the displacement of the storage instruction. This enables: (i) in the case of a load instruction, the address of the target storage registers to be generated more quickly; and/or (ii) in the case of a store instruction, the address of the target memory locations to be generated more quickly.

Some embodiments of the present invention may include one, or more, of the following operations, features, characteristics and/or advantages: (i) increase its performance by fusing a load-Immediate instruction with another instruction that produced a load-immediate instruction (sometimes herein called the "producer"); (ii) one example of a producer instruction is an addis instruction; (iii) this fusion of a load-immediate instruction and its producer typically leads to earlier load and store AGEN (address generation); and/or (iv) a method to handle execution of a fused Load-immediate with its producer to generate Load address earlier to improve performance.

A method according to an embodiment of the present invention includes the following operations (not necessarily in the following order): (i) IFU operation(s); (ii) dispatch operation(s); (iii) issue operation(s); (iv) VSU (vector scalar unit) operation(s); (v) LSU (load-store unit) operation(s); and (vi) completion operation(s). These six (6) operations will be respectively discussed in the following six (6) paragraphs.

IFU OPERATION(S): The IFU detects that two consecutive Addis and Load-Imm (that is, load-immediate) instructions are fusible, by determining whether one or more usability conditions are met. If the fusability condition(s) are met, then the IFU swaps the load-immediate and addis instructions at the id3 aligner, such that the load-immediate instruction is located in the even lane of a lane pair after the swap. For a destructive case, the addis instruction is suppressed on the odd lane of the lane pair. After the fused instruction is read from the Icache, the IFU communicates the fused instruction to the ISU on a lane pair.

DISPATCH OPERATION(S): Dispatch together as a full lane to an ISQ (issue queue) pair. In some embodiments, the organization of the hardware of the processor has multiple dispatch slots (for example, eight dispatch slots is a common quantity in commercially available processors). In some embodiments, each dispatch slot is connected to a dispatch port into the issue queue. For this invention, the dispatch of the addis and ld must be paired together. In some embodiments, dispatch slots 0,1 or 2,3 or 4,5, or 6,7 can be paired together to dispatch into an issue queue pair. "Dispatching together," as that term is used herein, means to dispatch at the same time in one of these paired configurations. In a destructive case only, dispatch finishes the odd itag at dispatch time. In order to support the non-destructive case, the fused instruction still has all the individual components of the un-fused instructions. Dispatch these together will put them into a single issue queue lane for ease of processing.

ISSUE OPERATION(S): An "entry pair" takes up a full ISQ entry. In some embodiments, the issue queue is organized by entry pairs where the entry can handle two (2) instructions. What takes up a full ISQ entry is occupying the same entry pair. Normal instructions dispatched to the ISQ, could dispatch two (2) instructions which occupy entry0 even and entry6 odd where each is half of their respective entry. In the case of the full ISQ entry, they must occupy the same entry # even and odd instruction of the entry. The fused instruction is issued once from the even ISQ entry with a fused issue that provides the iop and fused immediate fields. For non-destructive cases, the odd lane will issue independently as a normal iop. "iop" stands for instruction opcode. In some embodiments, the iop can be considered as "a normal instruction." What is referenced by even lane or odd lane, is referring to which side of the pair of dispatch slots or issue queue entries. For destructive cases, nothing is issued on the odd lane, which contains the older addis instruction.

VSU OPERATION(S): For the addis case, handled through operand muxing. Operand muxing is what chooses between multiple possible sources to generate the operands to pass over to the execution unit. Possible sources may be data from the register file, or a direct result coming from an execution unit or immediate data (text pulled from instruction). These all get muxed together beforehand in operand mux to allow the execution unit to just see the final operand. For the cases where the producer is an addis instruction, the VSU shifts and concatenates add immediates. For non-destructive cases, the VSU will execute the addis and write back the result as normal.

LSU OPERATION(S): The LSU computes the address (AGEN) using the source logical register value of the addis instruction and the two immediate fields as follows: (a) one immediate field from the addis instruction; and (b) one immediate field from the Load instruction. Normal Dcache access occurs after computation of the address of the registers which are the target of the load-immediate instruction. Then the LSU performs normal load-write-back and load-finish sub-operations.

COMPLETION OPERATION(S): When both halves of the fused instruction are finished, the Completion logic completes both halves of the fused instruction at the same time. In some embodiments, the basic pipeline is treated in the even/odd pair manner, as discussed above. One can think of this as groups of two (2) instructions. What it means to complete the fused instruction is that it is now committed and cannot be flushed out.

EXCEPTION HANDLING: There will now be discussion of what happens when the fused instruction causes an exception. If an exception is caused by the fused instruction, then the completion logic will flush both halves of the fused instruction. The completion logic will then signal the IFU to refetch the fused instruction as two separate instructions (that is, without fusing). The non-fused instructions will resume execution from the first half of the original fused instruction (that is, the addis instruction). The exception will be taken on the appropriate half of the original fused instruction (that is, the load-immediate instruction).

An embodiment of a method for fusion to enable early address generation of load and store in a microprocessor will now be discussed with respect to the high level flow of the method embodiment. This method embodiments includes the following operations (not necessarily in the following order): (i) machine logic according to the present invention detects instances where an addis instruction followed on a processor set by a load instruction where the load instruction is intended to load the result of the addis instruction from a set of register(s) in a microprocessor to memory (which may be on or off the microprocessor chip); (ii) the IDU (Instruction Decode Unit) pairs the two instructions together and marks as early address fusion enabled; (iii) dispatch will take this and will swap the two instructions such that the load instruction is in the even half and the addis instruction is in the odd half; (iv) dispatch will then swap the addis target register with the addis source register in the load operation as seen in diagram 500 of FIG. 5.

Figure 5:
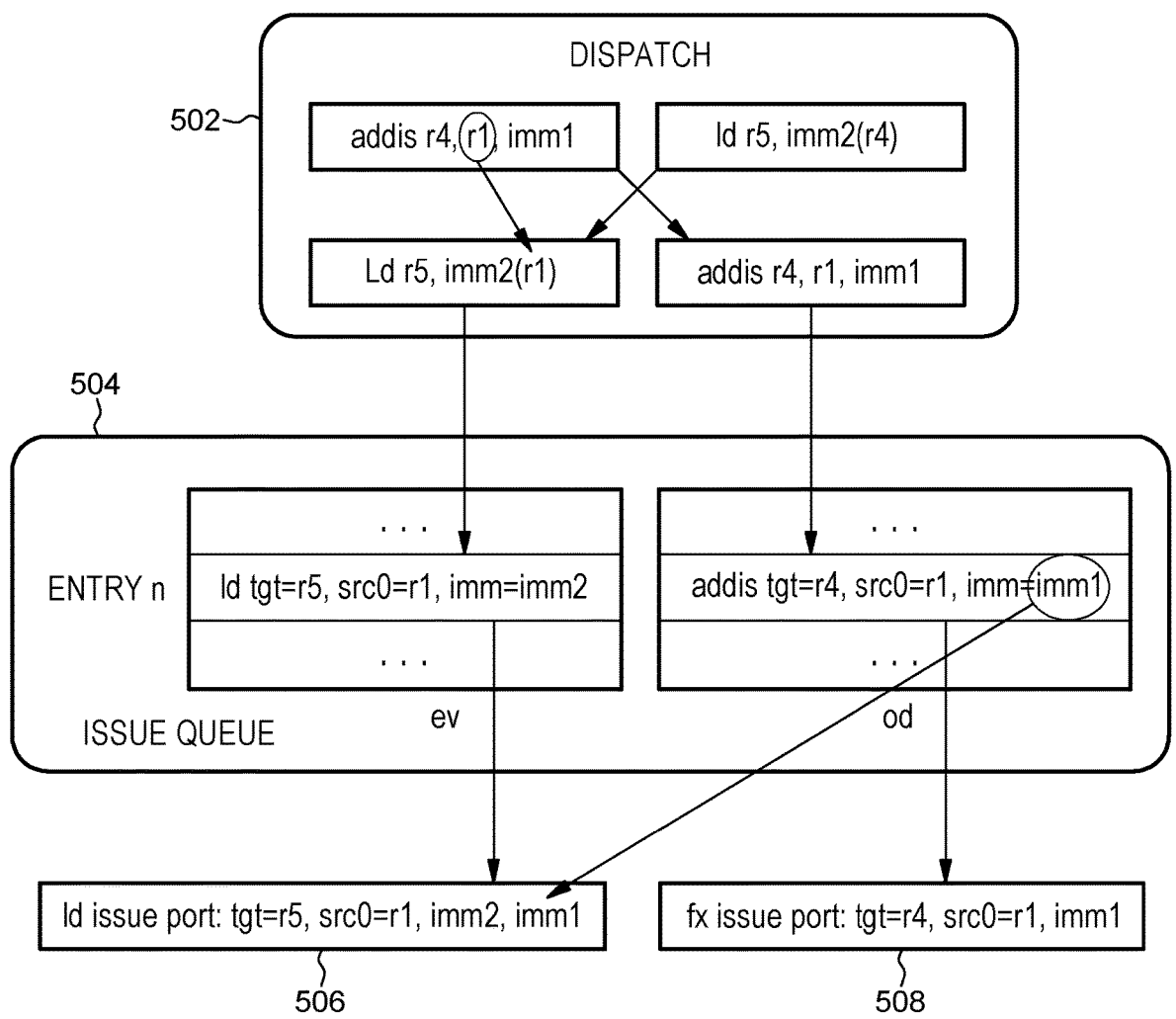
FIG. 5 is a diagram helpful in understanding various embodiments of the present invention.

As shown in FIG. 5, diagram 500 includes: dispatch block 502; issue queue (ISQ) block 504; load issue port block 506; and function issue port block 508.

Block 502 represents dispatch swapping the addis and ld instructions. In this step, the r1 operand from the addis is applied to the ld instruction.

Block 504 represents the issue queue entry which is written to by the dispatch. This is showing the entry pair containing the two (2) instructions.

Block 506 represents the issue to the load. This shows the load issue presented with the tgt=r5, the r1 value for src0 and the 2 immediate fields (imm1 and imm2).

Block 508 represents the issue to the fx (fixed point) unit for the addis instruction for the case where the load does not overwrite the logical register.

In some embodiments of the present invention, the load instruction will get written to the even Issue Queue (ISQ) entry marked with a fusion bit. The addis is written to the odd ISQ half. In a "destructive case," the addis instruction and the load instruction are targeting the same register. In a destructive case, dispatch will finish the odd itag and the odd ISQ entry will be marked as not requiring issue. For the non-destructive case, the odd half will be marked as issue required. Diagram 500 shows that when the load instruction is issued, it pulls the imm bit from the odd half of the issue queue entry. When the addis is issued, in a non-destructive case, it will issue as if it is a normal stand-alone addis instruction.

Figure 6:
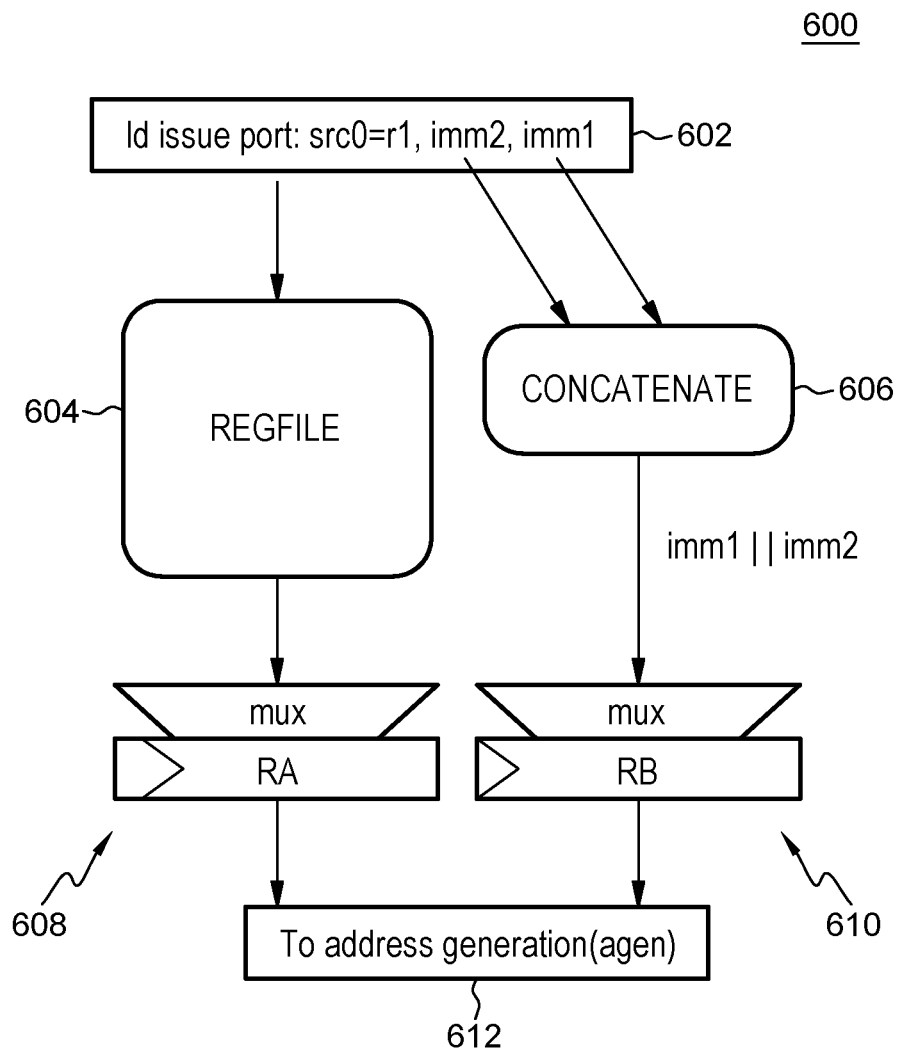
FIG. 6 is another diagram helpful in understanding various embodiments of the present invention.

As shown in FIG. 6, diagram 600 shows the sub-operations taken to provide the two (2) operands for the address generation. Diagram 600 includes: load issue port block 602; regfile block 604; concatenate block 606; first multiplexer block 608; second multiplexer block 610; and address generation block 612. Block 602, in diagram 600, is similar to block 506, in diagram 500.

Block 604 represents the physical register file where the logical General Purpose Registers (GPR) can be found. For the load issue here, the src0=r1 value is the address to send to the regfile to read out the register operand which will eventually go to operand RA.

Block 606 is a concatenation stage. For unsigned immed fields, this is just imm1 concatenated with imm2 (imm1||imm2). If signed and imm1 is negative, then this sub-operation requires more of a (imm1<<16)+imm2. In an example using an addi instruction, the block 606 would be more (imm1+imm2).

Block 608 is an operand mux for operand RA. This just selects between the result read from the regfile block 604 and potential other sources. For example, assume that the RA operand is read from the register file.

Block 610 is the operand mux for operand RB. This selects between the result of the concatenate block 606 and other potential other sources. For example, assume that the RB operand comes from the results of the concatenation stage.

Block 612 represents presenting the RA and RB operands to the address generation (AGEN) logic.

To further discuss the load instruction issue. The r1 value will be read from the register file and muxed into the operand latch RA. The 2 imm bits (from even and odd half of issue queue entry) are concatenated together and muxed into operand latch RB. From this point, the Load/Store Unit (LSU) will add the two (2) operands together to get the address. The rest of the flow in the execution unit flows like that of a normal load instruction.

For a non-destructive case, the ISQ entry can release the odd half once the load instruction has been successfully issued. For both cases, the odd half of the ISQ entry must wait for the even half to successfully issue. For the non-destructive case, the odd half (addis) may issue at any time once the source operand is available and may issue the same time, before or after the ld (even half).

In some embodiments, in Non-Destructive Fusion: (i) one ISS cycle, dual-issue to both FXU and LSU; and (ii) two (2) results are written back independently.

In some embodiments, in Destructive Fusion: (i) one ISS cycle, only issue to LSU; and (ii) only write back the result of second instruction (that is, the more recent instruction).

Some embodiments of the present invention may include one, or more, of the following operations, features, characteristics and/or advantages: (i) configured and/or programmed to handle the case of load instructions where the load address is RA+IMM (where IMM=constant defined by program); (ii) IFU (instruction fetch unit) is where instructions defined by the program are read from memory and passed on for decode; (iii) the issue queue holds dispatch instructions which are not ready to issue; (iv) "not ready to issue" can mean the instruction uses the results of a previous instruction which has not yet executed; (v) instructions get issued from the issue queue to the execution units; (vi) the VSU is where Vector and Scalar arithmetic operations are executed; (vii) the IDU is where fetched instructions get processed to be passed over for dispatch; and/or (viii) Issue (ISS) is where the Issue Queue (ISQ) sends the instruction to the execution unit.

As shown in FIG. 7, diagram 700 represents an example pipeline for the non-destructive case, and shows the addis and ld instructions being issued in the same cycle one to VSU and the other to LSU. It is noted that the non-destructive case does not require the addis and ld to be issued at the same time. In some embodiments, the LSU instruction does not have to wait for the addis to generate a result which would have forced the LSU to wait two (2) additional cycles before being able to issue.

As shown in FIG. 8, diagram 800 represents an example pipeline for a destructive case. Diagram 800 illustrates how, for the destructive case, the addis instruction does not need to be issued at all because it is only used to pass the value to the LD and the LD will overwrite its value in the register.

Some embodiments of the present invention may include one, or more, of the following operations, features, characteristics and/or advantages: (i) for use with a processor that includes a load store unit (LSU) that supports scalar and vector loads; (ii) in some embodiments the load store unit supports simple fixed-point and/or integer operations and/or has very limited fixed-point support; (iii) the address within a load instruction can be an Effective Address (EA) which is a logical address pointing to a memory location (RAM) where the data to be loaded into the processor is coming from; (iv) the load instruction can also hold a Real Address (RA) which is a physical address in memory where the data to be loaded is coming from; (v) a load store unit (LSU) can hold either RA or EA depending on the micro-architecture of the machine; (vi) the EA is the memory address seen by the program; (vii) the RA is the memory address as seen by the physical memory or RAM; (viii) when loading data from memory, the EA will get translated into the RA before sent out to memory (the details of this translation will be understood by those of skill in the art and are beyond the scope of this document); (ix) the address generated by the AGEN is the EA; and/or (x) the address generation unit is the AGEN feature within the LSU.

Some embodiments of the present invention may include one, or more, of the following operations, features, characteristics and/or advantages: (i) typically, microprocessors have some sort of Address Generation, and it is usually a part of the LSU; (ii) this address generation operation can be performed prior to accessing the LSU for purposes of performing the operation specified by the load-producing instruction (for example, an addis style load-producing instruction); (iii) normal load instructions generate the EA by adding 2 operands together RA+RB; (iv) for this case, both the base and offset are held within architected registers, such as general purpose registers (GPR)s; (v) the load-immediate operation will add together the RA value and the Imm field value, where: (a) the RA value comes from the GPR, and (b) the Imm field value is directly attached by the instruction; (vi) this allows programs to not have to write the offset into a second register before requesting the LD; (vii) tin some embodiments, the loads which are subject to fusion and associated early AGEN are those where the AGEN value is calculated by RA+imm; (viii) some examples of types of "subsidiary load instructions" suitable for early AGEN may include load byte and zero (lbz), load halfword and zero (lhz), load halfword algebraic (lha), load word and zero (lwz), load word algebraic (lwa), and load doubleword (1$d$); (ix) some examples of types subsidiary store instructions suitable for early AGEN may include: store byte (stb), store halfword (sth), store word (stw), and store doubleword (std); and/or (x) uses the following triggering conditions to determine that early AGEN generation will be performed: (a) an addis instruction is followed by a load instruction or store instruction where the generated address is calculable by the following formula: RA value+Imm value.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method for performance by a computer processor device, the method comprising:
receiving, by a thread in the processor, a shifted immediate field instruction;
determining, by the processor hardware, that the immediately subsequent instruction in the thread is a load/store-immediate instruction;
responsive to the determination that the immediately subsequent instruction in the thread is a load/store-immediate instruction; and
fusing the shifted immediate field instruction with the load/store-immediate instruction so that: (i) an order of the shifted immediate field instruction and the load/store immediate instruction is swapped, and (ii) the load/store immediate instruction is modified to include the operands of the shifted immediate field instruction.

2. The method of claim 1 further comprising:
reading a regfile to obtain a first operand; and
during the reading of the regfile, concatenating: (i) an immediate field from the shifted immediate field instruction; and (ii) a load location indicative of a second operand.

3. The method of claim 2 further comprising:
receiving, by an address generation portion (AGEN) of a load store unit in the processor hardware, a first operand from regfile;
obtaining, by the AGEN, a second operand from immediate field manipulation; and
generating a read address for use in the execution of the load operation.

4. The method of claim 3 further comprising:
reading, by the processor hardware and from a memory, or set of registers, data at a location indicated by the read address.

5. The method of claim 1 wherein the load/store immediate instruction is a load-immediate instruction (load-imm).

6. The method of claim 1 wherein the load/store immediate instruction is a store-immediate instruction (store-imm).

7. A computer processor device (CPD) including machine logic for causing the CPD to perform the following operations:
receiving, by a thread in the processor, a shifted immediate field instruction;
determining, by the processor hardware, that the immediately subsequent instruction in the thread is a load/store-immediate instruction;
responsive to the determination that the immediately subsequent instruction in the thread is a load/store-immediate instruction; and
fusing the shifted immediate field instruction with the load/store-immediate instruction so that: (i) an order of the shifted immediate field instruction and the load/store immediate instruction is swapped, and (ii) the load/store immediate instruction is modified to include the operands of the shifted immediate field instruction.

8. The CPD of claim 7 further including machine logic for causing the CPD to perform the following further operation(s):
reading a regfile to obtain a first operand; and
during the reading of the regfile, concatenating: (i) an immediate field from the shifted immediate field instruction; and (ii) a load location indicative of a second operand.

9. The CPD of claim 8 further including machine logic for causing the CPD to perform the following further operation(s):
receiving, by an address generation portion (AGEN) of a load store unit in the processor hardware, a first operand from regfile;
obtaining, by the AGEN, a second operand from immediate field manipulation; and
generating a read address for use in the execution of the load operation.

10. The CPD of claim 9 further including machine logic for causing the CPD to perform the following further operation(s):
  reading, by the processor hardware and from a memory, or set of registers, data at a location indicated by the read address.

11. The CPD of claim 7 wherein the load/store immediate instruction is a load-immediate instruction (load-imm).

12. The CPD of claim 7 wherein the load/store immediate instruction is a store-immediate instruction (store-imm).

13. The CPD of claim 7 wherein the machine logic is in the form of computer processor hardware.

14. A computer system (CS) comprising:
  a storage device with computer code and instructions stored thereon; and
  a computer processor device (CPD) including machine logic for causing the CPD to perform the following operations:
    receiving, by a thread in the processor, a shifted immediate field instruction,
    determining, by the processor hardware, that the immediately subsequent instruction in the thread is a load/store-immediate instruction,
    responsive to the determination that the immediately subsequent instruction in the thread is a load/store-immediate instruction, and
    fusing the shifted immediate field instruction with the load/store-immediate instruction so that: (i) an order of the shifted immediate field instruction and the load/store immediate instruction is swapped, and (ii) the load/store immediate instruction is modified to include the operands of the shifted immediate field instruction.

15. The CS of claim 14 further including machine logic for causing the CPD to perform the following further operation(s):
  reading a regfile to obtain a first operand; and
  during the reading of the regfile, concatenating: (i) an immediate field from the shifted immediate field instruction; and (ii) a load location indicative of a second operand.

16. The CS of claim 15 further including machine logic for causing the CPD to perform the following further operation(s):
  receiving, by an address generation portion (AGEN) of a load store unit in the processor hardware, a first operand from regfile;
  obtaining, by the AGEN, a second operand from immediate field manipulation; and
  generating a read address for use in the execution of the load operation.

17. The CS of claim 16 further including machine logic for causing the CPD to perform the following further operation(s):
  reading, by the processor hardware and from a memory, or set of registers, data at a location indicated by the read address.

18. The CS of claim 14 wherein the load/store immediate instruction is a load-immediate instruction (load-imm).

19. The CS of claim 14 wherein the load/store immediate instruction is a store-immediate instruction (store-imm).

20. The CS of claim 14 wherein the machine logic is in the form of computer processor hardware.

\* \* \* \* \*